Patented Nov. 24, 1942

2,303,191

UNITED STATES PATENT OFFICE 2,303,191

QUATERNARY AMMONIUM COMPOUND AND PROCESS OF MAKING THE SAME

Alfred William Baldwin and Henry Alfred Piggott, Blackley, Manchester, England, assignors to Imperial Chemical Industries Limited, a corporation of Great Britain No Drawing. Application August 23, 1938, Serial No. 226,376. In Great Britain February 27, 1936

13 Claims. (Cl. 260—295)

This application is a continuation-in-part of our copending application Serial No. 126,478, filed February 18, 1937 (now Patent No. 2,131,362, issued September 27, 1938).

In said copending application we have disclosed and claimed certain halogen compounds of the general formulae

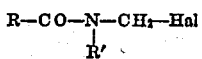

and

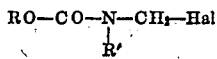

wherein R and R' each stand for an aliphatic or cycloaliphatic hydrocarbon radical, while Hal stands for halogen.

We have further disclosed in said copending application that by reaction with tertiary bases, for example pyridine or quinoline, the halides above referred to yield novel quaternary ammonium compounds of the general formulae

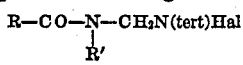

and

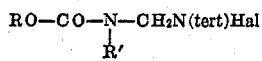

wherein R and R' have the same significance as above while N(tert) is the radical of a tertiary base.

Our present application deals particularly with the aforesaid quaternary ammonium compounds. It is accordingly an object of this invention to provide novel quaternary compounds of the above general formula, and processes for preparing the same. Other and further objects of this invention will appear as the description proceeds.

The above objects are achieved in a general way by reacting the halogen compounds of the first formulae above indicated with the desired tertiary bases. The latter may be selected from the group of aliphatic or cycloaliphatic tertiary amines, for instance, trimethyl-amine, triethyl-amine, diethyl-methyl-amine, triethanol-amine, methyl-piperidine, etc., are among the group of heterocyclic tertiary bases such as pyridine, quinoline and their homologs.

The reaction may be effected by bringing the halogen-compound and the base together, if desired in presence of a suitable inert solvent, for instance diethyl ether, acetone, methyl-ethyl-ketone or ethylene dichloride. The solvent is not essential, it serves as a diluent to diminish the vigour of the reaction. Where the base employed is liquid, an excess thereof may be employed as solvent. The quaternary ammonium compound, being insoluble in such solvents in the cold, precipitates out and may be filtered off.

The novel quaternary compounds are generally solids at ordinary temperatures soluble in water, alcohol, warm benzene and ethylene dichloride. But their most valuable characteristic, from a technical viewpoint, is the fact that when applied to textile fiber, for instance natural or artificial cellulose, according to copending application of Baldwin et al. Serial No. 113,702 (now Patent No. 2,278,417, issued April 7, 1942) they impart to the fiber a water-repellent finish of a permanent character, that is one withstanding treatment with soap and alkalies.

Without limiting our invention to any particular procedure the following examples in which parts by weight are given will serve to illustrate our preferred mode of operation.

*Example 1.*—10 parts of laurocyclohexylamide (M. P. 75 to 76° C., obtained by interaction of lauric acid chloride and cyclohexyl-amine) are mixed with 4.4 parts of para-formaldehyde and 150 parts of dry benzene in a vessel fitted with a suitable condenser arranged for distillation. The temperature is raised until the reaction mixture boils gently, and dry hydrogen chloride gas is passed in.

Water is formed in the reaction which takes place, and is allowed to distill over slowly as an azeotropic mixture with benzene. The passing of hydrogen chloride and the slow distillation is proceeded with until no more water passes over, that is, until the distillate comes over clear. The residual benzene is evaporated from the reaction mixture under diminished pressure, the cooled residue is extracted with cold dry ether and filtered. By evaporating the ethereal filtrate there is obtained a new chlorine-containing compound N-cyclohexyllauramidomethyl chloride corresponding to the formula

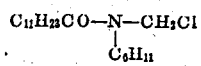

If pyridine is added to the ethereal filtrate obtained as above, there is precipitated a quaternary pyridinium salt which may be filtered off. This quaternary salt is soluble in cold water to give foaming solutions which solutions lose their foaming power when boiled.

*Example 2.*—25 parts of stearomethylamide, which may be made by interacting stearic acid or stearyl chloride with methylamine, and 2.6 parts of para-formaldehyde are suspended in 150 parts of dry benzene. Gaseous hydrogen chloride is passed into the stirred mixture, keeping the temperature below 10° C. until the saturation point is reached and no solid remains undissolved in the benzene. 20 parts of freshly dehydrated magnesium sulphate are then added to absorb the water which will be produced when the temperature of the benzene solution is slowly raised to boil. After heating at the boil for 5 to 10 minutes the reaction mixture is filtered and the benzene evaporated from the filtrate. The residue so obtained is extracted with petroleum ether (B. P. 40° to 60° C.), the ether extract after standing at 15° to 20° C. for a short time is filtered, and the product is recovered from the filtrate by evaporating the petroleum ether, preferably under reduced pressure. The product so obtained is a low-melting, waxy solid containing combined chlorine which fumes somewhat in moist air. The new compound is believed to be N-methyl-stearamidomethyl chloride, and to have the formula

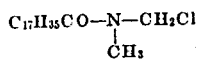

34.5 parts of this chloride are mixed with 200 parts of pyridine, and the reaction product which separates out is filtered off. It may be washed with acetone to free it from excess pyridine. The white product is soluble in water and alcohol. When cellulosic material is treated with a dilute solution of this product and heated in an oven with rapid air circulation to from 120 to 170° C. it becomes strongly water repellent. Repeated washings do not diminish this property.

Example 3.—34.5 parts of the N-methyl-stearamido-methyl-chloride obtained in Example 2 are gradually stirred into 200 parts of acetone containing 6 parts of trimethyl amine. The white solid which separates out is filtered off and dried. It dissolves readily in water at 40° C., and also in alcohol, benzene and ethylenedichloride.

Example 4.—30 parts of methyl heptadecylcarbamate (American Chemical Journal 1899, 22, 14) and 3 parts of para-formaldehyde are suspended in 100 parts of dry benzene. Gaseous hydrogen chloride is passed into the stirred mixture, keeping the temperature below 10° C. until a clear benzene solution saturated with hydrogen chloride is obtained. Water is produced in the reaction which takes place and the reaction mixture separates into two layers. The lower aqueous layer is removed and the upper benzene layer is dried by standing over calcium chloride. The dried benzene solution is filtered, and the product is recovered from the filtrate by evaporating the benzene, preferably under reduced pressure. The product is a colorless oil containing combined chlorine. It tends to crystallize on standing at atmospheric temperature and fumes in moist air. The new compound is believed to be N-carbomethoxyheptadecylamino-methyl chloride and to have the formula $$CH_3O-CO-N-CH_2Cl$$
$$|$$
$$C_{17}H_{35}$$

36 parts of this chloride are thoroughly mixed with 12 parts of pyridine. The two products react readily with liberation of heat. The resulting product may be freed from the excess of pyridine by washing with a solvent like ether or acetone. It is water soluble and has considerable foaming properties.

Example 5.—25 parts of methyl undecylcarbamate (American Chemical Journal, 1899, 22, 14) and 5 parts of para-formaldehyde are suspended in 120 parts of dry benzene. Gaseous hydrogen chloride is passed into the stirred mixture, keeping the temperature below 10° C., until a clear benzene solution saturated with hydrogen chloride is obtained. Water is produced in the reaction and the reaction mixture separates into two layers. The lower aqueous layer is removed, and the upper benzene layer is dried by standing over calcium chloride and the product is isolated by evaporating the benzene, preferably under reduced pressure. The product is a light colored oil, and can be distilled as a colorless oil, boiling point 98° C., under a pressure of 10 to 3 mm. of mercury. It fumes in moist air, and is obtained in 66% yield of distilled material. The new compound is believed to be N-carbomethoxyundecylaminomethyl chloride, and to have the formula

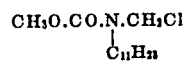

27.3 parts of this chloride are dissolved in 100 parts of diethyl-ether and gradually added to 200 parts of ether which contain 8 parts of pyridine. A precipitate is formed which is soluble in cold water and alcohol.

Example 6.—20 parts of methyl butylcarbamate (Receiul des travaux chimiques des Pays-Bas 1895, 14, 18) and 8 parts of para-formaldehyde are suspended in 120 parts of dry benzene. Gaseous hydrogen chloride is passed into the stirred mixture, keeping the temperature below 10° C., until a clear benzene solution saturated with hydrogen chloride is obtained. Water is produced in the reaction, and the reaction mixture separates into two layers, the lower aqueous layer being then removed and the upper benzene layer dried over calcium chloride. The product is recovered by evaporating the benzene from the dried benzene layer and distilling the residue. The product boils at 28° C., under a pressure of 10 to 3 mm. of mercury and is obtained in a 66% yield of distilled material. The new compound is believed to be N-carbomethoxybutylaminomethyl chloride, and to have the formula

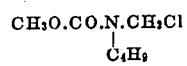

18 parts of this product are mixed with 20 parts of dry pyridine. The solid reaction product may be freed from the excess of pyridine by extraction with ether or acetone. It is readily soluble in water and alcohol.

Example 7.—12 parts of acetoundecylamide (which may be made by the interaction of undecylamine and acetyl chloride (and 2 parts of para-formaldehyde are suspended in 60 parts of dry benzene. Gaseous hydrogen chloride is passed into the stirred mixture, keeping the temperature below 10° C. until a clear benzene solution saturated with hydrogen chloride is obtained. The benzene solution is dried over calcium chloride and evaporated to dryness. The residue so obtained is extracted with petroleum ether, boiling point 40 to 60° C. and the ether extract after standing at 15 to 20° C. for a short time is filtered and the product recovered from the filtrate by evaporating the petroleum ether, preferably under reduced pressure. The new compound so obtained is believed to be N-acetoundecylamidomethyl chloride and to have the formula

26.1 parts of this chloride were added gradually to a solution of methyl-diethylol amine in acetone. The quarternary ammonium compound which precipitates is water soluble and foams strongly.

*Example 8.*—9 parts of stearomethylamide and 3 parts of paraformaldehyde are suspended in 200 parts of boiling benzene in a vessel fitted with a suitable condenser arranged for distillation. Gaseous hydrogen chloride is passed in, and the water produced in the reaction allowed to distill off as an azeotropic mixture with benzene and so be removed from the reaction mixture. This procedure is continued until water no longer distills over with the benzene. The reaction mixture is then cooled, filtered and the filtrate is evaporated to dryness. The residue so-obtained is extracted with petroleum ether (B. P. 40 to 60° C.), the ether extract after standing at 15 to 20° C. for a short time is filtered and the product recovered from the filtrate by evaporating the petroleum ether, preferably under reduced pressure. The product so-obtained is a low-melting, waxy solid identical in behaviour with the product of Example 2 and has a similar composition, that is, it is believed to be N-methyl-stearamidomethyl chloride.

34.5 parts of this chloride are mixed with 11.5 parts of commercial pyridine bases. The quarternary salt may be washed with acetone to remove the excess of the pyridine bases. It is soluble in warm water and decomposes when the aqueous solution is boiled or made alkaline with caustic alkalies.

*Example 9.*—If in Example 2 gaseous hydrogen bromide is used in place of hydrogen chloride there is obtained a yellow crystalline solid which contains combined bromine and which reacts readily with tertiary amines, e. g. pyridine, in the cold. The new bromine containing compound is believed to be N-methylstearamidomethyl bromide, corresponding to the formula,

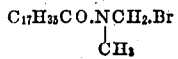

39.0 parts of this bromide are dissolved in 200 parts of acetone and added to a solution of trimethyl amine in acetone. The N-methyl-stearamidomethyl-trimethyl ammonium bromide separates out and is filtered off. It dissolves in alcohol and water.

We claim:

1. A quaternary compound of the general formula

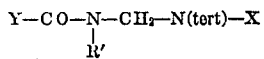

wherein Y stands for a radical of the group consisting of alkyl, alkoxy, cycloalkyl and cycloalkoxy, N(tert) stands for the molecule of a nitrogenous tertiary base, R' stands for a member of the group consisting of aliphatic and cycloaliphatic hydrocarbon radicals, while X stands for halogen.

2. A quaternary compound of the general formula

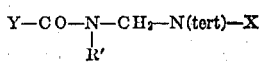

wherein Y stands for an aliphatic hydrocarbon radical having not less than 9 carbon atoms, R' stands for a member of the group consisting of aliphatic and cycloaliphatic hydrocarbon radicals of not more than 7 carbon atoms, N(tert) stands for the molecule of a nitrogenous tertiary base, while X stands for halogen.

3. A quaternary compound of the general formula

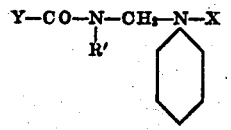

wherein Y stands for an aliphatic hydrocarbon radical having not less than 9 carbon atoms, R' stands for a member of the group consisting of aliphatic and cycloaliphatic hydrocarbon radicals of not more than 7 carbon atoms, while X stands for halogen.

4. A quaternary ammonium compound of the general formula

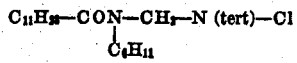

wherein N(tert) stands for the molecule of a nitrogenous tertiary base, said compound being obtainable by reacting N-cyclohexyl-lauramido-methyl-chloride with a tertiary nitrogenous base, and being a solid, soluble in water, alcohol, warm benzene and ethylenedichloride.

5. A quaternary ammonium compound of the general formula

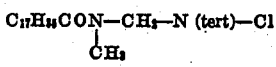

wherein N(tert) stands for the molecule of a nitrogenous tertiary base, said compound being obtainable by reacting N-methyl-stearamido-methyl-chloride with a tertiary nitrogenous base, and being a solid, soluble in water, alcohol, warm benzene and ethylenedichloride.

6. A quaternary ammonium compound of the general formula

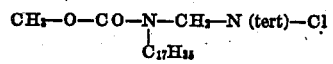

wherein N(tert) stands for the molecule of a nitrogenous tertiary base, said compound being obtainable by reacting N-carbomethoxy-heptadecylamino-methyl-chloride with a tertiary nitrogenous base, and being a solid, soluble in water, alcohol, warm benzene and ethylenedichloride.

7. A process of preparing quaternary compounds of the general formula as defined in claim 1, which comprises reacting a tertiary base with a compound of the general formula

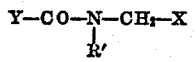

wherein Y stands for a radical of the group consisting of alkyl, alkoxy, cycloalkyl and cycloalkoxy, R' stands for a member of the group consisting of aliphatic and cycloaliphatic hydrocarbon radicals, while X stands for halogen.

8. A process of preparing quaternary compounds of the general formula as defined in claim 2, which comprises reacting a tertiary base with a compound of the general formula

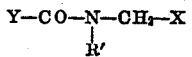

wherein Y stands for an aliphatic hydrocarbon radical having not less than 9 carbon atoms, R' stands for a member of the group consisting of aliphatic and cycloaliphatic hydrocarbon radicals of not more than 7 carbon atoms, while X stands for halogen.

9. A quaternary compound of the general formula $$R-O-CO-N-CH_2-N(tert)-X$$
$$|$$
$$R'$$

wherein R and R' are aliphatic hydrocarbon radicals of which R' has at least 4 carbon atoms, N(tert) stands for the molecule of a nitrogenous tertiary base, while X stands for halogen.

10. N-cyclohexyl-lauramidomethyl-pyridinium chloride.

11. N - methyl - stearamidomethyl - pyridinium chloride.

12. N-carbomethoxy-heptadecylamino-methyl-pyridinium chloride.

13. A process of preparing quaternary compounds of the general formula as defined in claim 9, which comprises reacting a tertiary base with a compound of the general formula $$R-O-CO-N-CH_2-X$$
$$|$$
$$R'$$

wherein R and R' are aliphatic hydrocarbon radicals of which R' has at least 4 carbon atoms, while X stands for halogen.

ALFRED WILLIAM BALDWIN.
HENRY ALFRED PIGGOTT.